US009889588B2

(12) United States Patent
Gong et al.

(10) Patent No.: US 9,889,588 B2
(45) Date of Patent: *Feb. 13, 2018

(54) METHOD FOR INTEGRALLY MOLDING METAL AND RESIN AND METAL-RESIN COMPOSITE STRUCTURE OBTAINABLE BY THE SAME

(71) Applicants: BYD COMPANY LIMITED, Shenzhen, Guangdong (CN); SHENZHEN BYD AUTO R&D COMPANY LIMITED, Shenzhen, Guangdong (CN)

(72) Inventors: Qing Gong, Guangdong (CN); Xiong Zhang, Guangdong (CN); Yihu Zhang, Guangdong (CN); Wei Zhou, Guangdong (CN)

(73) Assignees: SHENZHEN BYD AUTO R&D COMPANY LIMITED, Shenzhen (CN); BYD COMPANY LIMITED, Shenzhen (CN)

(*) Notice: Subject to any disclaimer, the term of this patent is extended or adjusted under 35 U.S.C. 154(b) by 278 days.

This patent is subject to a terminal disclaimer.

(21) Appl. No.: 14/466,363

(22) Filed: Aug. 22, 2014

(65) Prior Publication Data
US 2014/0363631 A1 Dec. 11, 2014

Related U.S. Application Data

(63) Continuation of application No. PCT/CN2012/078832, filed on Jul. 18, 2012.

(30) Foreign Application Priority Data

Feb. 24, 2012 (CN) .......................... 2012 1 0043644

(51) Int. Cl.
B32B 5/18 (2006.01)
B29C 45/14 (2006.01)
B32B 15/08 (2006.01)
C25D 11/08 (2006.01)
C25D 11/16 (2006.01)
C25D 11/24 (2006.01)
C25D 11/30 (2006.01)
C25D 11/34 (2006.01)
B32B 27/32 (2006.01)
B32B 27/36 (2006.01)
B29K 69/00 (2006.01)
B29K 105/00 (2006.01)
B29K 705/02 (2006.01)
B29L 9/00 (2006.01)

(52) U.S. Cl.
CPC .. B29C 45/14795 (2013.01); B29C 45/14311 (2013.01); B29C 45/14778 (2013.01); B32B 15/08 (2013.01); C25D 11/08 (2013.01); C25D 11/16 (2013.01); C25D 11/24 (2013.01); C25D 11/30 (2013.01); C25D 11/34 (2013.01); B29C 2045/14803 (2013.01); B29C 2045/14868 (2013.01); B29K 2069/00 (2013.01); B29K 2105/0005 (2013.01); B29K 2105/0088 (2013.01); B29K 2705/02 (2013.01); B29K 2715/003 (2013.01); B29K 2995/0097 (2013.01); B29L 2009/003 (2013.01); B32B 27/32 (2013.01); B32B 27/365 (2013.01); B32B 2270/00 (2013.01); B32B 2311/24 (2013.01); B32B 2311/30 (2013.01); B32B 2369/00 (2013.01); B32B 2509/00 (2013.01); B32B 2605/08 (2013.01); Y10T 428/24545 (2015.01); Y10T 428/31507 (2015.04)

(58) Field of Classification Search
None
See application file for complete search history.

(56) References Cited

U.S. PATENT DOCUMENTS

| 4,154,705 | A |   | 5/1979 | Baldi |
| 4,499,237 | A | * | 2/1985 | Tacke ...................... C08L 69/00 525/67 |
| 4,687,551 | A | * | 8/1987 | Furneaux ............ B01D 67/0065 205/50 |
| 5,021,504 | A | * | 6/1991 | Fujita ...................... C08L 23/02 525/133 |
| 5,332,780 | A |   | 7/1994 | Kitazawa et al. |

(Continued)

FOREIGN PATENT DOCUMENTS

CN 1190062 A 8/1998
CN 1492804 A 4/2004

(Continued)

OTHER PUBLICATIONS

PCT International Search Report dated Dec. 13, 2012, issued in International Application No. PCT/CN2012/078832 (4 pages).
Furneaux et al., "The Formation of Controlled-porosity Membranes from Anodically Oxidized Aluminum," Nature, vol. 337, No. 6203, Jan. 12, 1989, pp. 147149.
Gong et al., "Electrochemical/chemical Synthesis of Nanostructured Arrays of Oxide Cones or Rings," Journal of Materials Chemistry. vol. 18, No. 15, Mar. 12, 2008, pp. 1741-1746.
Lee et al., "NanostructureDependent WaterDroplet Adhesiveness Change in Superhydrophobic Anodic Aluminum Oxide Surfaces: From Highly Adhesive to Self-Cleanable," Langmuir Letter, vol. 26, No. 3, Feb. 2, 2010, pp. 1412-1415, including Supporting Information, Dec. 29, 2009.

(Continued)

Primary Examiner — Shamim Ahmed

(57) ABSTRACT

A method for integrally molding a metal and a resin and a metal-resin composite structure obtainable by the same are provided. The method comprises forming a nanopore in a surface of a metal sheet; melting a thermoplastic resin on the surface of the metal sheet formed with the nanopore; and injection molding the thermoplastic resin onto the surface of the metal sheet. The thermoplastic resin includes a mixture of a main resin and a polyolefin resin, the main resin is a polycarbonate, and the polyolefin resin has a melting point of about 65° C. to about 105° C.

12 Claims, No Drawings

(56) References Cited

U.S. PATENT DOCUMENTS

| | | | |
|---|---|---|---|
| 5,602,200 A * | 2/1997 | Wissmann | C08L 51/06 525/179 |
| 5,951,747 A | 9/1999 | Lewis | |
| 6,495,225 B1 * | 12/2002 | Nakajima | C08L 1/02 428/35.6 |
| 6,804,081 B2 | 10/2004 | Den et al. | |
| 7,841,577 B2 | 11/2010 | Yamaguchi et al. | |
| 7,879,734 B2 | 2/2011 | Fukutani et al. | |
| 8,703,272 B2 | 4/2014 | Naritomi et al. | |
| 2001/0036559 A1 | 11/2001 | Ulrich et al. | |
| 2002/0033108 A1 | 3/2002 | Akiyama et al. | |
| 2002/0040888 A1 | 4/2002 | Marczak et al. | |
| 2003/0001274 A1 | 1/2003 | Den et al. | |
| 2003/0180555 A1 | 9/2003 | Wakayama et al. | |
| 2004/0013931 A1 | 1/2004 | Takamura et al. | |
| 2004/0062943 A1 | 4/2004 | Naritomi et al. | |
| 2004/0142503 A1 | 7/2004 | Lee et al. | |
| 2004/0229031 A1 | 11/2004 | Gell et al. | |
| 2006/0046602 A1 | 3/2006 | Kang | |
| 2006/0054589 A1 | 3/2006 | Omori et al. | |
| 2006/0055084 A1 | 3/2006 | Yamaguchi et al. | |
| 2006/0057492 A1 | 3/2006 | Kunita | |
| 2006/0088680 A1 | 4/2006 | Kitahara | |
| 2006/0127684 A1 | 6/2006 | Naritomi et al. | |
| 2006/0257624 A1 | 11/2006 | Naritomi et al. | |
| 2007/0096359 A1 | 5/2007 | Torfs | |
| 2007/0116934 A1 * | 5/2007 | Miller | C25D 1/10 428/172 |
| 2007/0196637 A1 | 8/2007 | Good et al. | |
| 2008/0041257 A1 | 2/2008 | Teng | |
| 2008/0057336 A1 | 3/2008 | Kurokawa et al. | |
| 2008/0070152 A1 | 3/2008 | Yu | |
| 2008/0081867 A1 | 4/2008 | Sakata et al. | |
| 2008/0102404 A1 | 5/2008 | Tashiro et al. | |
| 2009/0017242 A1 | 1/2009 | Weber et al. | |
| 2009/0075156 A1 | 3/2009 | Long et al. | |
| 2009/0155522 A1 | 6/2009 | Raghavendran | |
| 2009/0202840 A1 | 8/2009 | Griebel et al. | |
| 2009/0274889 A1 | 11/2009 | Iwahashi et al. | |
| 2009/0280296 A1 | 11/2009 | Naritomi et al. | |
| 2009/0304970 A1 | 12/2009 | Imaizumi et al. | |
| 2010/0018025 A1 | 1/2010 | Naritomi et al. | |
| 2010/0021718 A1 * | 1/2010 | Vos | B32B 5/26 428/315.9 |
| 2010/0028602 A1 | 2/2010 | Naritomi et al. | |
| 2010/0177392 A1 | 7/2010 | Masuda et al. | |
| 2010/0189958 A1 | 7/2010 | Naritomi et al. | |
| 2010/0190029 A1 | 7/2010 | Ueki | |
| 2010/0215965 A1 | 8/2010 | Tadaki | |
| 2010/0218827 A1 | 9/2010 | Aono et al. | |
| 2010/0255732 A1 * | 10/2010 | Kohmura | B29C 45/14311 439/733.1 |
| 2010/0283165 A1 | 11/2010 | Ihara | |
| 2010/0304083 A1 | 12/2010 | Naritomi et al. | |
| 2010/0316878 A1 | 12/2010 | Naritomi et al. | |
| 2010/0319757 A1 | 12/2010 | Oetting | |
| 2011/0008644 A1 | 1/2011 | Naritomi et al. | |
| 2011/0111214 A1 | 5/2011 | Endo et al. | |
| 2011/0165342 A1 | 7/2011 | Imai et al. | |
| 2011/0250377 A1 | 10/2011 | Qin | |
| 2011/0281135 A1 | 11/2011 | Gong et al. | |
| 2011/0297549 A1 | 12/2011 | Chen et al. | |
| 2011/0300400 A1 | 12/2011 | Tomita et al. | |
| 2011/0305893 A1 | 12/2011 | Chang et al. | |
| 2011/0318585 A1 | 12/2011 | Su et al. | |
| 2012/0015186 A1 | 1/2012 | Honma et al. | |
| 2012/0039066 A1 | 2/2012 | Hatanaka et al. | |
| 2012/0043689 A1 | 2/2012 | Chang et al. | |
| 2012/0094108 A1 | 4/2012 | Chang et al. | |
| 2012/0168990 A1 | 7/2012 | Kuwahara et al. | |
| 2012/0213971 A1 | 8/2012 | Ihara | |
| 2012/0237755 A1 | 9/2012 | Chang et al. | |
| 2013/0043689 A1 | 2/2013 | Tai et al. | |
| 2013/0052582 A1 | 2/2013 | Hayashi | |
| 2013/0078423 A1 | 3/2013 | Sutou et al. | |
| 2013/0242487 A1 | 9/2013 | Fujioka et al. | |
| 2014/0360974 A1 | 12/2014 | Sun et al. | |
| 2014/0363623 A1 | 12/2014 | Sun et al. | |
| 2014/0363657 A1 | 12/2014 | Gong et al. | |
| 2014/0363658 A1 | 12/2014 | Sun et al. | |
| 2014/0363659 A1 | 12/2014 | Sun et al. | |
| 2014/0363660 A1 | 12/2014 | Gong et al. | |
| 2014/0363686 A1 | 12/2014 | Sun et al. | |

FOREIGN PATENT DOCUMENTS

| | | |
|---|---|---|
| CN | 1639387 A | 7/2005 |
| CN | 1706992 A | 12/2005 |
| CN | 1711170 A | 12/2005 |
| CN | 1717323 A | 1/2006 |
| CN | 101010452 A | 8/2007 |
| CN | 101248219 A | 8/2008 |
| CN | 101313087 A | 11/2008 |
| CN | 101341023 A | 1/2009 |
| CN | 101396888 A | 4/2009 |
| CN | 101409229 A | 4/2009 |
| CN | 101547779 A | 9/2009 |
| CN | 101568420 A | 10/2009 |
| CN | 101578170 A | 11/2009 |
| CN | 101607446 A | 12/2009 |
| CN | 101623933 A | 1/2010 |
| CN | 101640169 A | 2/2010 |
| CN | 101687390 A | 3/2010 |
| CN | 101743111 A | 6/2010 |
| CN | 101795845 A | 8/2010 |
| CN | 101802263 A | 8/2010 |
| CN | 101875251 A | 11/2010 |
| CN | 101913065 A | 12/2010 |
| CN | 101937935 A | 1/2011 |
| CN | 101941271 A | 1/2011 |
| CN | 101988609 A | 3/2011 |
| CN | 102021569 A | 4/2011 |
| CN | 102039700 A | 5/2011 |
| CN | 102056724 A | 5/2011 |
| CN | 102229266 A | 11/2011 |
| CN | 102234803 A | 11/2011 |
| CN | 102268183 A | 12/2011 |
| CN | 102345127 A | 2/2012 |
| CN | 102371679 A | 3/2012 |
| CN | 102441962 A | 5/2012 |
| CN | 102442028 A | 5/2012 |
| CN | 102666921 A | 9/2012 |
| CN | 102776466 A | 11/2012 |
| CN | 103036086 A | 4/2013 |
| EP | 1643546 A2 | 4/2006 |
| EP | 1958763 A1 | 8/2008 |
| EP | 2031099 A1 | 3/2009 |
| EP | 2154203 A1 | 2/2010 |
| EP | 2221398 A1 | 8/2010 |
| EP | 2426237 A1 | 3/2012 |
| JP | 50-39759 | 4/1975 |
| JP | S59211576 A | 11/1984 |
| JP | 61-106796 A | 5/1986 |
| JP | H06272085 A | 9/1994 |
| JP | 2000144491 A | 5/2000 |
| JP | 2001254009 A | 5/2000 |
| JP | 2001315159 A | 11/2001 |
| JP | 2002225164 A | 8/2002 |
| JP | 2004-55248 | 2/2004 |
| JP | 2004249681 A | 9/2004 |
| JP | 2005-342895 A | 12/2005 |
| JP | 2006-001216 A | 1/2006 |
| JP | 2006027018 A | 2/2006 |
| JP | 2007-16123 A * | 1/2007 |
| JP | 2007050630 A | 3/2007 |
| JP | 2007203585 A | 8/2007 |
| JP | 2008091933 A | 4/2008 |
| JP | 2008095132 A | 4/2008 |
| JP | 2006124827 A | 5/2008 |
| JP | 2008138288 A | 6/2008 |
| JP | 2008156381 A | 7/2008 |
| JP | 2008243412 A | 10/2008 |
| JP | 2009041008 A | 2/2009 |

(56) References Cited

FOREIGN PATENT DOCUMENTS

| | | | |
|---|---|---|---|
| JP | 2009267334 A | 11/2009 | |
| JP | 2010-000679 A | 1/2010 | |
| JP | 2010-030177 A | 2/2010 | |
| JP | 2010030177 A | 2/2010 | |
| JP | 2010-64496 | 3/2010 | |
| JP | 2010110931 A | 5/2010 | |
| JP | 2011021260 A | 2/2011 | |
| JP | 2011168017 A | 9/2011 | |
| JP | 2011174133 A | 9/2011 | |
| JP | 2011194594 A | 10/2011 | |
| JP | 2011218603 A | 11/2011 | |
| JP | 2012006392 A | 1/2012 | |
| JP | 2012193448 A | 10/2012 | |
| KR | 20060104540 A | 10/2006 | |
| KR | 20080062814 A | 7/2008 | |
| KR | 20090027317 A | 3/2009 | |
| KR | 20090089852 A | 8/2009 | |
| WO | WO 01/38444 A1 | 5/2001 | |
| WO | WO 2004/048087 A1 | 6/2004 | |
| WO | 2005109984 A2 | 11/2005 | |
| WO | 2007066742 A1 | 6/2007 | |
| WO | WO 2009/078377 A1 | 6/2009 | |
| WO | WO 2010/073636 A1 | 7/2010 | |
| WO | WO 2011/055757 A1 | 5/2011 | |
| WO | WO 2011/071102 A1 | 6/2011 | |
| WO | WO 2011/123790 A1 | 10/2011 | |
| WO | WO 2013/123754 A1 | 8/2013 | |
| WO | WO 2013/123756 A1 | 8/2013 | |
| WO | WO 2013/123769 A1 | 8/2013 | |
| WO | WO 2013/123770 A1 | 8/2013 | |
| WO | WO 2013/123771 A1 | 8/2013 | |
| WO | WO 2013/123772 A1 | 8/2013 | |
| WO | WO 2013/123773 A1 | 8/2013 | |
| WO | WO 2013/123898 A1 | 8/2013 | |
| WO | 2013148476 A1 | 10/2013 | |
| WO | 2013178057 A1 | 12/2013 | |
| WO | 2014101778 A1 | 7/2014 | |

OTHER PUBLICATIONS

Extended European Search Report dated Sep. 25, 2015, issued in related European Patent Application No. EP 12869418.9 (7 pages).
Extended European Search Report dated Sep. 25, 2015, issued in related European Patent Application No. EP12869214.2 (6 pages).
PCT International Preliminary Report on Patentability dated Aug. 26, 2014, issued in related International Application No. PCT/CN2012/078830 (5 pages).
PCT International Preliminary Report on Patentability dated Aug. 26, 2014, issued in related International Application No. PCT/CN2012/078832 (5 pages).
PCT International Preliminary Report on Patentability dated Aug. 26, 2014, issued in related International Application No. PCT/CN2012/082025 (5 pages).
PCT International Preliminary Report on Patentability dated Aug. 26, 2014, issued in related International Application No. PCT/CN2012/082029 (5 pages).
PCT International Preliminary Report on Patentability dated Aug. 26, 2014, issued in related International Application No. PCT/CN2012/082043 (5 pages).
PCT International Preliminary Report on Patentability dated Aug. 26, 2014, issued in related International Application No. PCT/CN2013/071797 (7 pages).
PCT International Preliminary Report on Patentability dated Aug. 26, 2014. issued in related International Application No. PCT/CN2012/082031 (5 pages}.
PCT International Search Report and Written Opinion dated Mar. 27, 2014, issued in related International Application No. PCT/CN2013/090471 (13 pages).
PCT International Search Report and Written Opinion dated Sep. 5, 2013, issued in related International Application No. PCT/CN2013/076351 (12 pages).
Non-Final Office Action dated May 24, 2016, issued in related U.S. Appl. No. 14/466,906 (11 pages).
Non-Final Office Action dated Feb. 18, 2016, issued in related U.S. Appl. No. 14/466,927 (15 pages).
Non-Final Office Action dated Apr. 8, 2016, issued in related U.S. Appl. No. 14/466,932 (9 pages).
Final Office Action dated Jun. 20, 2016, issued in related U.S. Appl. No. 14/466,932 (10 pages).
PCT International Search Report dated Nov. 29, 2012, issued in International Application No. PCT/CN2012/078830 (4 pages).
PCT International Search Report dated Jan. 3, 2013, issued in International Application No. PCT/CN2012/082025 (4 pages).
PCT International Search Report dated Jan. 3, 2013, issued in International Application No. PCT/CN2012/082029 (4 pages).
PCT International Search Report dated Jan. 3, 2013, issued in International Application No. PCT/CN2012/082031 (4 pages).
PCT International Search Report dated Jan. 3, 2013, issued in International Application No. PCT/CN2012/082036 (4 pages).
PCT International Search Report dated Jan. 10, 2013, issued in International Application No. PCT/CN2012/082043 (4 pages).
PCT International Search Report dated May 30, 2013, issued in International Application No. PCT/CN2013/071797 (4 pages).
Database CA [Online] Chemical Abstracts Service, Jan. 26, 2006, Taisei Plas Co., Ltd., Japan: Composite materials of anodized aluminum alloys and thermoplastic resins, and their manufacture by injection molding, and Abstract for JP 2006-001216, Jan. 5, 2006 (3 pages).
Database WPI, Thomson Scientific, 2009, and Abstract for KR 2009-0027317, Cotec Corp., Mar. 17, 2009 (2 pages).
Database WPI, Thomson Scientific, 2011, and Abstract for JP 2011-218603, Teijin Kasei Ltd., Nov. 4, 2011 (2 pages).
Gong et al., "Electrochemical/chemical synthesis of nanostructured arrays of oxide cones or rings", *Journal of Materials Chemistry*, vol. 18, No. 15, Mar. 12, 2008, pp. 1741-1746.
Lee et al., "Nanostructure-Dependent Water-Droplet Adhesiveness Change in Superhydrophobic Anodic Aluminum Oxide Surfaces: From Highly Adhesive to Self-Cleanable", *Langmuir Letter*, vol. 26, No. 3, Feb. 2, 2010, pp. 1412-1415, including Supporting Information, Dec. 29, 2009.
Non-Final Office Action dated Sep. 20, 2016, issued in related U.S. Appl. No. 14/466,932 (17 pages).
Non-Final Office Action dated Aug. 3, 2016, issued in related U.S. Appl. No. 14/466,937 (14 pages).
Non-Final Office Action for U.S. Appl. No. 14/466,853, dated Sep. 30, 2016, (12 pages).
Non-Final Office Action dated Aug. 17, 2016, issued in related U.S. Appl. No. 14/466,873 (15 pages).
Non-Final Office Action dated Aug. 1, 2016, issued in related U.S. Appl. No. 14/466,920 (12 pages).
Final Office Action dated Jul. 21, 2016, issued in related U.S. Appl. No. 14/466,927 (13 pages).
Final Office Action for U.S. Appl. No. 14/466,906, dated Nov. 9, 2016, 13 pages.
Final Office Action for U.S. Appl. No. 14/466,932, dated Jan. 20, 2017, 15 pages.
Non-Final Office Action for U.S. Appl. No. 14/554,370, dated Feb. 2, 2017, 10 pages.
Final Office Action for U.S. Appl. No. 14/466,920, dated Feb. 16, 2017, 15 pages.
Final Office Action for U.S. Appl. No. 14/466,873, dated Feb. 16, 2017, 16 pages.
Final Office Action for U.S. Appl. No. 14/466,937, dated Feb. 17, 2017, 14 pages.
Non-Final Office Action for U.S. Appl. No. 14/466,927, dated Feb. 21, 2017, 21 pages.
Final Office Action for U.S. Appl. No. 14/466,853, dated Mar. 13, 2017, 15 pages.
Non-Final Office Action for U.S. Appl. No. 14/466,932, dated Apr. 28, 2017, 25 pages.
Non-Final Office Action for U.S. Appl. No. 14/723,344, dated Jun. 8, 2017, 15 pages.
Final Office Action for U.S. Appl. No. 14/466,927, dated Jul. 17, 2017, 21 pages.
Final Office Action for U.S. Appl. No. 14/466,932, dated Sep. 1, 2017, 12 pages.

* cited by examiner

METHOD FOR INTEGRALLY MOLDING METAL AND RESIN AND METAL-RESIN COMPOSITE STRUCTURE OBTAINABLE BY THE SAME

CROSS-REFERENCE TO RELATED APPLICATION

This application is a continuation of International Patent Application No. PCT/CN2012/078832, filed on Jul. 18, 2012, which claims priority to and benefits of Chinese Patent Application Serial No. 201210043644.X, filed with the State Intellectual Property Office of P.R. China on Feb. 24, 2012. The entire content of the above-referenced applications is incorporated herein by reference.

FIELD

The present disclosure relates to the field of metal-plastic molding, and more particularly to a method for integrally molding a metal and a resin, and a metal-resin composite structure obtained by the same.

BACKGROUND

In the fields of manufacture of articles such as automobiles, household appliances and industrial machines, a metal and a resin often need to be firmly bonded together. Currently, in a conventional method, an adhesive is used at normal temperature or under heating to integrally bond a metal and a synthetic resin. Alternatively, an engineering resin with high strength may also be bonded to a magnesium alloy, an aluminum alloy, or ferroalloys such as stainless steel directly without an adhesive.

Nano molding technology (NMT) is a technique of integrally bonding a metal and a resin, which allows the resin to be directly injection molded on a surface of a metal sheet by nano molding the surface of the metal sheet so as to obtain a metal-resin integrally molded product. For effective bonding of a metal and a resin, NMT may replace commonly used insert molding or zinc-aluminum or magnesium-aluminum die casting so as to provide a metal-resin integrally molded product with low cost and high performance. Compared with the bonding technology, NMT may reduce the weight of the product, ensure excellent strength of the mechanical structure, high processing rate, and high output, allow more appearance decoration methods, applicable to vehicles, IT equipment, and 3C products.

Japan's Taisei Plas Co., Ltd. filed a series of patent applications including, for example, CN1492804A, CN1717323A, CN101341023A and CN101631671A, which disclose methods for integrally molding a metal and a resin composition. For example, by using a resin composition containing polyphenylene sulfide (PPS), polybutylene terephthalate (PBT), and polyamide (PA) with high crystallinity as an injection molding material, the resin composition is directly injection molded on a surface of a nano molded aluminum alloy layer to allow the resin composition to immerse in a nanoscale micropore, so as to obtain a metal-resin integrally molded product with a certain mechanical strength. However, because the resins used in these methods are all highly crystalline resins, the resins cannot be made into components with transparency, thereby restricting the design and application of the product.

SUMMARY

Embodiments of the present disclosure seek to solve at least one of the problems existing in the prior art to at least some extent, particularly technical problems of complex molding process, unduly restrictive conditions, the difficulty in processing the surface of the plastic layer, the difficulty in applying to the surface decoration of a plastic article, and low mechanical strength when the plastic is a highly crystalline resin in nano molding technology (NMT).

According to a first aspect of the present disclosure, there is provided a method for integrally molding a metal and a resin. The method comprises steps of:
A) forming a nanopore in a surface of a metal sheet; and
B) melting a thermoplastic resin on the surface of the metal sheet formed with the nanopore, and then injection molding the thermoplastic resin onto the surface of the metal sheet,
in which the thermoplastic resin is a mixture of a main resin and a polyolefin resin, the main resin is a polycarbonate, and the polyolefin resin has a melting point of about 65° C. to about 105° C.

According to a second aspect of the present disclosure, there is provided a metal-resin composite structure, which may be obtained by the method according to the first aspect of the present disclosure.

In the method for integrally molding the metal and the resin according to an embodiment of the present disclosure, a polycarbonate with higher light transmittance is used, and a polyolefin resin with a melting point of about 65° C. to about 105° C. is also used. Therefore, injection molding at a specific mould temperature may not be required during the molding, subsequent annealing treatment may also not be required, the molding process may be simplified, and it may be ensured that the obtained metal-resin composite structure may have high mechanical strength and good surface treatment characteristics, thus enhancing the light transmittance of a plastic article.

Additional aspects and advantages of embodiments of present disclosure will be given in part in the following descriptions, become apparent in part from the following descriptions, or be learned from the practice of the embodiments of the present disclosure.

DETAILED DESCRIPTION

Reference will be made in detail to embodiments of the present disclosure. The embodiments described herein are explanatory, illustrative, and used to generally understand the present disclosure. The embodiments shall not be construed to limit the present disclosure.

According to a first aspect of the present disclosure, a method for integrally molding a metal and a resin is provided. The method comprises steps of:
A) forming a nanopore in a surface of a metal sheet; and
B) melting a thermoplastic resin on the surface of the metal sheet formed with the nanopore, and then injection molding the thermoplastic resin onto the surface of the metal sheet, in which the thermoplastic resin is a mixture of a main resin and a polyolefin resin, the main resin is a polycarbonate, and the polyolefin resin has a melting point of about 65° C. to about 105° C.

Because the resins used in the prior art are all highly crystalline resins, the surface of the prior art plastic layer may be difficult to treat. In the present disclosure, a non-crystalline polycarbonate, which has a surface gloss and a toughness both superior to those of the highly crystalline resins in the prior art, is used as an injection molding material, and a polyolefin resin with a melting point of about 65° C. to about 105° C. is also used. Therefore, injection molding at a specific mould temperature may not be required during the molding. Subsequent annealing treatment may also not be required. The molding process may be simplified. And it may be ensured that the obtained metal-resin composite structure has high mechanical strength and good surface treatment characteristics, thus solving the problem of the conventional techniques and enhancing the light transmittance of plastic articles.

In the present disclosure, the mechanism of the metal-resin integrally molding is as follows: a nanoscale micropore is formed on the surface of the metal sheet; a resin composition is melted on the surface of the metal sheet, where a part of the melted resin composition permeates into the nanoscale micropore; and then the metal and the resin composition are integrally injection molded.

Particularly, in step A), forming a nanopore on a surface of a metal sheet comprises: anodizing the surface of the metal sheet to form an oxide layer on the surface of the metal sheet, in which the oxide layer is formed with the nanopore. The anodizing technique is well known to those skilled in the art. In some embodiments, anodizing the surface of the metal sheet may comprise: placing a pretreated metal sheet as an anode in a $H_2SO_4$ solution with a concentration of about 10 wt % to about 30 wt %; and electrolyzing the metal at a temperature of about 10° C. to about 30° C. at a voltage of about 10V to about 100V for about 1 min to about 40 min to form the oxide layer with a thickness of about 1 μm to about 10 μm on the surface of the metal sheet. An anodizing apparatus may be those known in the art, such as, an anodizing bath.

By anodizing, the oxide layer formed with the nanopore is formed on the surface of the metal sheet. Preferably, the oxide layer has a thickness of about 1 μm to about 10 μm, more preferably about 1 μm to about 5 μm.

According to an embodiment, the nanopore has a diameter of about 10 nm to about 100 nm. According to a further embodiment, the nanopore has a diameter of about 20 nm to about 80 nm. According to a still further embodiment, the nanopore has a diameter of about 20 nm to about 60 nm. According to an embodiment, the nanopore has a depth of about 0.5 μm to about 9.5 μm. According to a further embodiment, the nanopore has a depth of about 0.5 μm to about 5 μm. The structure of the nanopore enhances the filling of the melted resin composition in the nanopore. The nanopore with such depth may be filled with the melted resin in a conventional injection molding process, which, while retaining the bonded area between the resin and the oxide layer, may further improve the bonding force between the resin and the metal because there are no voids or gaps in the nanopore.

In one preferred embodiment, in step A), forming a nanopore in a surface of a metal sheet may further comprise a step of: immersing the metal sheet formed with the oxide layer on the surface thereof in an etching solution to form a corrosion pore in an outer surface of the oxide layer. The corrosion pore is communicated with the nanopore. The corrosion pore and the nanopore form a double-layer three-dimensional pore structure, thereby enhancing the permeability of the resin composition, improving the bonding force between the resin composition and the metal, and thus further facilitating the molding.

According to an embodiment, the corrosion pore has a diameter of about 200 nm to about 2000 nm. According to a further embodiment, the corrosion pore has a diameter of about 200 nm to about 1000 nm. According to a still further embodiment, the corrosion pore has a diameter of about 400 nm to about 1000 nm. According to an embodiment, the corrosion pore has a depth of about 0.5 μm to about 9.5 μm. According to a further embodiment, the corrosion pore has a depth of about 0.5 μm to about 5 μm. The structure of the corrosion pore facilitates direct injection of the resin composition and the bonding between the resin composition and the alloy during the injection molding.

The etching solution may be a solution that corrodes the oxide layer. Generally, the etching solution may be a solution that dissolves the oxide layer. The concentration of the etching solution may be adjusted as desired. The etching solution may be an acid/base etching solution. Preferably, the etching solution may be a single basic solution with a pH of about 10 to about 13 or a complex buffer solution. The single basic solution with a pH of about 10 to about 13 may be at least one selected from the group consisting of a $Na_2CO_3$ aqueous solution, a $NaHCO_3$ aqueous solution, and a NaOH aqueous solution, preferably a $Na_2CO_3$ aqueous solution and/or a $NaHCO_3$ aqueous solution, thus allowing the corrosion pores to be uniformly distributed in the surface of the oxide layer and to have uniform diameter, and achieving better bonding performance between the resin layer and an aluminum alloy substrate as well as higher tensile strength and better integral bonding of an aluminum alloy composite structure. The $Na_2CO_3$ aqueous solution and/or the $NaHCO_3$ aqueous solution may have a solid content of about 0.1 wt % to about 15 wt %. The complex buffer solution may be a mixed solution of a soluble hydrophosphate and a soluble base, for example, an aqueous solution of sodium dihydrogen phosphate and sodium hydroxide. The aqueous solution of sodium dihydrogen phosphate and sodium hydroxide may have a solid content of about 0.1 wt % to about 15 wt %.

Immersing the metal sheet formed with the oxide layer on the surface thereof in an etching solution may comprise repeatedly immersing the metal sheet in the etching solution 2 to 10 times with each immersing time of about 1 minute to 60 minutes, and cleaning the metal sheet with deionized water after each immersing. Cleaning the metal sheet may comprise placing the metal sheet in a washing bath to wash the metal sheet for about 1 minute to about 5 minutes, or placing the metal sheet in a washing bath to place the metal sheet for about 1 min to about 5 minutes.

It has been found by the inventors through many experiments that in the present disclosure, by using a polyolefin resin with a melting point of about 65° C. to about 105° C. in the non-crystalline main resin, the flowing capability of the resin in the nano on the surface of the metal sheet may be enhanced, thus ensuring strong adhesive force between the metal and the plastic as well as high mechanical strength of the metal-resin composite structure. Preferably, based on 100 weight parts of the thermoplastic resin, the amount of the main resin is about 95 weight parts to about 99 weight parts, and the amount of the polyolefin resin is about 1 weight part to about 5 weight parts.

It has also been found by the inventors that by using a flow improver in the thermoplastic resin, the flowing capability of the resin may be enhanced, thus further enhancing the adhesive force between the metal and the plastic as well as the injection molding performance of the resin. Preferably, based on 100 weight parts of the thermoplastic resin, the thermoplastic resin further contains about 1 weight part to about 5 weight parts of a flow improver. Preferably, the flow improver is a methyl methacrylate composition.

In the present disclosure, the main resin is a polycarbonate (PC), which may be selected from any straight chain polycarbonate and/or any branched chain polycarbonate commonly used in the prior art. For example, the polycarbonate may be PC IR2500 or IR2200 available from Idemitsu Kosan Co., Ltd., without special limits.

In the present disclosure, the polyolefin resin has a melting point of about 65° C. to about 105° C. Preferably, the polyolefin resin may be a grafted polyethylene. More preferably, the polyolefin resin may be a grafted polyethylene with melting point of about 100° C. or about 105° C.

In the present disclosure, the metal may be any metal known, and may be selected according to the specific application. For example, the metal may be at least one selected from the group consisting of aluminum, stainless steel and magnesium.

According to a second aspect of the present disclosure, a metal-resin composite structure is also provided, which is obtained by the method according to the first aspect of the present disclosure.

In the metal-resin composite structure according to an embodiment of the present disclosure, the metal sheet and the plastic layer are integrally formed, providing strong adhesive force and high mechanical strength. As shown in Table 1, each metal-resin composite structure has a fracture strength of about 15 MPa to about 20 MPa, an impact strength of about 350 J/m to about 400 J/m and a light transmittance of about 50% to about 52%.

The present disclosure provides further details of the embodiments with reference to examples thereof. It would be appreciated that particular examples described herein are merely used to understand the present disclosure. The examples shall not be construed to limit the present disclosure. The raw materials used in the examples and the comparative examples are all commercially available, without special limits.

Example 1

Pretreatment

A commercially available A5052 aluminum alloy plate with a thickness of 1 mm was cut into 18 mm×45 mm rectangular sheets, which were then immersed in a 40 g/L NaOH aqueous solution. The temperature of the NaOH aqueous solution was 40° C. After 1 minute, the rectangular sheets were washed with water and dried to obtain pretreated aluminum alloy sheets.

(2) Surface Treatment 1:

Each aluminum alloy sheet as an anode was placed in an anodizing bath containing a 20 wt % $H_2SO_4$ solution, the aluminum alloy was electrolyzed at a voltage of 20V at 18° C. for 10 min, and then the aluminum alloy sheet was blow-dried.

The cross section of the aluminum alloy sheet after the surface treatment 1 was observed by a metalloscope, to find out that an aluminum oxide layer with a thickness of 5 μm was formed on the surface of the electrolyzed aluminum alloy sheet. The surface of the aluminum alloy sheet after the surface treatment 1 was observed by an electron microscope, to find out that a nanopore with a diameter of about 40 nm to about 60 nm and a depth of 1 μm was formed in the aluminum oxide layer.

(3) Surface Treatment 2:

500 ml of 10 wt % sodium carbonate solution (pH=12) with a temperature of 20° C. was prepared in a beaker. The aluminum alloy sheet after step (2) was immersed in the sodium carbonate solution, taken out after 5 minutes, and placed in a beaker containing water to be immersed for 1 minute. The process was repeated for 5 times. After water immersing for the last time, the aluminum alloy sheet was blow-dried.

The surface of the aluminum alloy sheet after the surface treatment 2 was observed by an electron microscope, to find out that a corrosion pore with a diameter of 300 nm to 1000 nm and a depth of 4 μm was formed in the surface of the immersed aluminum alloy sheet. It may also be observed that there was a double-layer three-dimensional pore structure in the aluminum oxide layer, and the corrosion pore was communicated with the nanopore.

(4) Molding:

95 weight parts of a straight chain polycarbonate PC (IR2200 available from Idemitsu Kosan Co., Ltd.), 3 weight parts of a flow improver (TP003 available from Mitsubishi Rayon Co., Ltd.) and 2 weight parts of a grafted polyethylene with a melting point of 65° C. (Lotader AX8900 available from Arkema Group) were weighed, and mixed uniformly to obtain a resin mixture. Then, using an injection molding machine, the melted resin mixture was injection molded on the surface of the aluminum alloy sheet after step (3), to obtain a metal-resin composite structure S1 in this example.

Example 2

A metal-resin composite structure S2 in this example was prepared by a method which is substantially the same as the method in Example 1, with the following exceptions.

In step (1), instead of the aluminum alloy plate in Example 1, a commercially available magnesium alloy plate with a thickness of 3 mm was cut into 18 mm×45 mm rectangular sheets.

In step (2), each magnesium alloy sheet as an anode was placed in an anodizing bath containing a 20 wt % $H_2SO_4$ solution. The magnesium alloy was electrolyzed at a voltage of 15V at 18° C. for 10 min. And then the magnesium alloy sheet was blow-dried.

The cross section of the magnesium alloy sheet after the surface treatment 1 was observed by a metalloscope, to find out that a magnesium oxide layer with a thickness of 5 μm was formed on the surface of the electrolyzed magnesium alloy sheet. The surface of the magnesium alloy sheet after the surface treatment 1 was observed by an electron microscope, to find out that a nano micropore with a diameter of 20 nm to 40 nm and a depth of 1 μm was formed in the magnesium oxide layer.

The surface of the magnesium alloy sheet after the surface treatment 2 was observed by an electron microscope, to find out that a corrosion pore with a diameter of 300 nm to 1000 nm and a depth of 4 μm was formed in the surface of the immersed magnesium alloy sheet. It may also be observed that there was a double-layer three-dimensional pore structure in the magnesium oxide layer, and the corrosion pore was communicated with the nanopore.

After the above steps, the metal-resin composite structure S2 in this example was obtained.

Example 3

A metal-resin composite structure S3 in this example was prepared by a method which is substantially the same as the method in Example 1, with the following exceptions.

In step (2), each aluminum alloy sheet as an anode was placed in an anodizing bath containing a 20 wt % $H_2SO_4$ solution, the aluminum alloy was electrolyzed at a voltage of 40V at 18° C. for 10 min, and then the aluminum alloy sheet was blow-dried.

The cross section of the aluminum alloy sheet after the surface treatment 1 was observed by a metalloscope, to find out that an aluminum oxide layer with a thickness of 5 μm was formed on the surface of the electrolyzed aluminum alloy sheet. The surface of the aluminum alloy sheet after the surface treatment 1 was observed by an electron microscope, to find out that a nanopore with a diameter of 60 nm to 80 nm and a depth of 1 μm was formed in the aluminum oxide layer.

The surface of the aluminum alloy sheet after the surface treatment 2 was observed by an electron microscope, to find out that a corrosion pore with a diameter of 300 nm to 1000 nm and a depth of 4 μm was formed in the surface of the immersed aluminum alloy sheet. It may also be observed that there was a double-layer three-dimensional pore structure in the aluminum oxide layer, and the corrosion pore was communicated with the nanopore.

After the above steps, the metal-resin composite structure S3 in this example was obtained.

Example 4

A metal-resin composite structure S4 in this example was prepared by a method which is substantially the same as the method in Example 2, with the following exceptions.

In step (4), 98 weight parts of a straight chain polycarbonate PC (IR2200 available from Idemitsu Kosan Co., Ltd.) and 2 weight parts of a grafted polyethylene with a melting point of 105° C. (Lotader 4210 available from Arkema Group) were weighed, and mixed uniformly to obtain a resin mixture. Then, using an injection molding machine, the melted resin mixture was injection molded on the surface of the aluminum alloy sheet after step (3), to obtain a metal-resin composite structure S4 in this example.

Comparative Example 1

A metal-resin composite structure DS1 in this example was prepared by a method which is substantially the same as the method in Example 1, with the following exceptions.

In step (4), 97 weight parts of a straight chain polycarbonate PC (IR2200 available from Idemitsu Kosan Co., Ltd.) and 3 weight parts of a flow improver (TP003 available from Mitsubishi Rayon Co., Ltd.) were weighed, and mixed uniformly to obtain a resin mixture. Then, using an injection molding machine, the melted resin mixture was injection molded on the surface of the aluminum alloy sheet after step (3), to obtain a metal-resin composite structure DS1 in this example.

Comparative Example 2

A metal-resin composite structure DS2 in this example was prepared by a method which is substantially the same as the method in Example 1, with the following exceptions.

In step (4), 84 weight parts of polyphenylene sulfide PPS (PPS-HCl available from Sichuan Deyang Chemical Co., Ltd., China), 3 weight parts of a flow improver, i.e., a cyclic polyester (CBT100), 8 weight parts of a grafted polyethylene with a melting point of 105° C. (Lotader AX8900 available from Arkema Group) and 5 weight parts of a toughener (Lotader AX8840 available from Arkema Group) were weighed, and mixed uniformly to obtain a resin mixture. Then, using an injection molding machine, the melted resin mixture was injection molded on the surface of the aluminum alloy sheet after step (3) to obtain an injection molded metal-resin composite structure, which was annealed at 180° C. for 1 hour to obtain a metal-resin composite structure DS2 in this example.

Performance Test

1) The metal-resin composite structures S1-S4 and DS1-DS4 were fixed on a universal testing machine for tensile test to obtain maximum loads thereof respectively. The test results were shown in Table 1.

2) The impact strength of standard samples of the metal-resin composite structures S1-S4 and DS1-DS4 was tested using a cantilever beam impact tester according to the method disclosed in ASTM D256.

3) 40.0 mm×40.0 mm×2.0 mm square samples were made of the resin mixtures in Examples 1-4 and Comparative Examples 1-2 respectively, and the light transmittance of the square samples were tested using a spectrophotometer respectively.

The test results were shown in Table 1.

TABLE 1

| Sample | Fracture Strength (MPa) | Impact Strength (J/m) | Light Transmittance (%) | Sample | Fracture Strength (MPa) | Impact Strength (J/m) | Light Transmittance (%) |
|---|---|---|---|---|---|---|---|
| S1 | 22 | 350 | 50 | S2 | 20 | 350 | 50 |
| S3 | 19 | 350 | 50 | S4 | 19 | 400 | 52 |
| DS1 | 10 | 500 | 55 | DS2 | 20 | 130 | — |

It may be seen from the test results in Table 1 that the metal-resin composite structures S1-S4 have a fracture strength of about 19 MPa to about 22 MPa, which indicates that the bonding force between the metal sheet and the plastic layer in the metal-resin composite structures S1-S4 is very strong; the metal-resin composite structures S1-S4 have an impact strength of about 350 J/m to about 400 J/m, which indicates that the metal-resin composite structures S1-S4 have high mechanical strength; and the metal-resin composite structures S1-S4 have a light transmittance of about 50% to about 52%, which may meet the requirement of light transmission applications.

By comparing the test results of the metal-resin composite structure S1 with the test results of the metal-resin composite structure DS2, it may be seen that the toughness of the polyphenylene oxide resin used in the prior art is very poor, the toughness of the polyphenylene oxide resin after modified with a toughener is still poor, and the metal-resin composite structure DS2 is unable to meet the requirement of the light transmission applications.

Although explanatory embodiments have been shown and described, it would be appreciated by those skilled in the art that the above embodiments can not be construed to limit the present disclosure, and changes, alternatives, and modifications can be made in the embodiments without departing from spirit, principles and scope of the present disclosure.

What is claimed is:

1. A method for integrally molding a metal and a resin, comprising:

forming nanopores on a surface of a metal sheet;

forming corrosion pores on the surface of the metal sheet, thereby to form a double-layer pore structure including the corrosion pores and the nanopores, the corrosion pores being in communication with the nanopores and the corrosion pores having a larger diameter than the nanopores;

melting a thermoplastic resin; and injection molding the melted thermoplastic resin onto the surface of the metal sheet through the nanopores and the corrosion pores, wherein the melted thermoplastic resin composition is fixedly attached to the metal sheet, wherein the thermoplastic resin includes a mixture of a main resin and a polyolefin resin, the main resin is a polycarbonate, and the polyolefin resin has a melting point of about 65° C. to about 105° C.

2. The method according to claim 1, wherein forming the nanopores on the surface of the metal sheet comprises:

anodizing the surface of the metal sheet to form an oxide layer on the surface of the metal sheet, where the oxide layer includes the nanopores.

3. The method according to claim 2, wherein the oxide layer has a thickness of about 1 µm to about 10 µm, and the nanopores have an average diameter of about 10 nm to about 100 nm and an average depth of about 0.5 µm to about 9.5 µm.

4. The method according to claim 2, wherein anodizing the surface of the metal sheet comprises:

placing a pretreated metal sheet as an anode in a $H_2SO_4$ solution with a concentration of about 10 wt % to about 30 wt %; and electrolyzing the metal sheet at a temperature of about 10° C. to about 30° C. at a voltage of about 10V to about 100V for about 1 minute to about 40 minutes to form the oxide layer with a thickness of about 1 µm to about 10 µm on the surface of the metal sheet.

5. The method according to claim 2, wherein forming the corrosion pores on the surface of the metal sheet comprises:

immersing the metal sheet including the oxide layer on the surface thereof in an etching solution to form the corrosion pores on an outer surface of the oxide layer.

6. The method according to claim 5, wherein the corrosion pores have an average diameter of about 200 nm to about 2000 nm and an average depth of about 0.5 µm to about 9.5 µm.

7. The method according to claim 5, wherein the etching solution corrodes the oxide layer.

8. The method according to claim 1, wherein based on 100 weight parts of the thermoplastic resin, the amount of the main resin is about 95 weight parts to about 99 weight parts, and the amount of the polyolefin resin is about 1 weight part to about 5 weight parts.

9. The method according to claim 8, wherein based on 100 weight parts of the thermoplastic resin, the thermoplastic resin further contains about 1 weight part to about 5 weight parts of a flow improver, and the flow improver is a cyclic polyester.

10. The method according to claim 1, wherein the polyolefin resin is a grafted polyethylene.

11. The method according to claim 1, wherein the metal is at least one selected from the group consisting of aluminum, stainless steel and magnesium.

12. A method for integrally molding a metal and a resin, comprising:

A) forming nanopores on a surface of a metal sheet by anodizing the surface of the metal sheet to form an oxide layer on the surface of the metal sheet, wherein the oxide layer includes the nanopores;

B) immersing the metal sheet including the oxide layer on the surface thereof in an etching solution to form corrosion pores on an outer surface of the oxide layer, wherein the corrosion pores and the nanopores form a double-layer pore structure and the corrosion pores are in communication with the nanopores;

C) melting a thermoplastic resin; and

D) injection molding the melted thermoplastic resin onto the surface of the metal sheet formed with the nanopores and corrosion pores wherein the melted thermoplastic resin composition is fixedly attached to the metal sheet, wherein the thermoplastic resin includes a mixture of a main resin and a polyolefin resin, the main resin is a polycarbonate, and the polyolefin resin has a melting point of about 65° C. to about 105° C., and wherein the nanopores have an average diameter of about 10 nm to about 100 nm and the corrosion pores have an average diameter of about 200 nm to about 2000 nm.

* * * * *